United States Patent [19]

Shirouzu et al.

[11] Patent Number: 4,805,062

[45] Date of Patent: Feb. 14, 1989

[54] DC CIRCUIT BREAKER AND METHOD OF COMMUTATION THEREOF

[75] Inventors: Tatsuji Shirouzu; Masatoshi Morita; Satoshi Mizuno, all of Hitachi, Japan

[73] Assignee: Hitachi, Ltd., Tokyo, Japan

[21] Appl. No.: 108,009

[22] Filed: Oct. 14, 1987

[30] Foreign Application Priority Data

Oct. 15, 1986 [JP] Japan .............................. 61-242996

[51] Int. Cl.[4] ......................... H02H 3/00; H01H 9/30

[52] U.S. Cl. .......................................... 361/4; 361/13

[58] Field of Search ........................ 361/2, 4, 5, 13, 14

[56] References Cited

U.S. PATENT DOCUMENTS 4,618,905 10/1986 Tokuyama ............................ 361/4

FOREIGN PATENT DOCUMENTS 54-149873 5/1978 Japan .

OTHER PUBLICATIONS

Greenwood, A. H. and Lee, T. H., "Theory and Application of the Commutation Principle for HVDC Circuit Breakers," (Nov. 30, 1971), pp. 1570–1574.

*Primary Examiner*—L.T. HIX
*Assistant Examiner*—David Porterfield
*Attorney, Agent, or Firm*—Antonelli, Terry and Wands

[57] ABSTRACT

A DC circuit breaker and a method of commutation during a commutation capacitor capable of being directly charged from a main DC line are disclosed. A breaker unit is inserted in a main DC line and is connected through a first switch in parallel to a series circuit including a commutation capacitor and a reactor. At end of the commutation capacitor is connected to the power side of the main DC line, and the other end thereof to the negative bus of the DC line through a charge capacitor. A series circuit including a magnetic repulsive coil and a second switch is connected in parallel to the commutation capacitor, which is directly charged from the power side of the main DC line. When the breaker unit starts to open, the second switch is turned on so that the polarity of the charged commutation capacitor is reversed to permit a discharged current to flow in the breaker unit in the opposite direction, while at the same time starting the opening of the breaker unit.

5 Claims, 2 Drawing Sheets

DC CIRCUIT BREAKER AND METHOD OF COMMUTATION THEREOF

BACKGROUND OF THE INVENTION

The present invention relates to a DC circuit breaker and a method of commutation thereof, or more in particular to a system for inserting a reverse current by use of a commutation capacitor capable of direct charge from a DC line.

A basic circuit of a conventional DC circuit breaker of reverse current insertion type is shown in FIG. 1. This type of DC circuit breaker is described in JP-A-No. 54-149873.

As shown in FIG. 1, a conventional DC circuit breaker of reverse current insertion type is configured of a breaker unit 2 inserted in series in a main DC line 1, and a series connection of a commutation capacitor 3, a reactor 4 and a first switch 5 including a thyristor or a trigger gap inserted in parallel to the breaker unit 2. In FIG. 1, reference numeral 1*a* designates a power-side terminal of the DC line 1, numeral 1*b* a load-side terminal of the DC line 1, numeral 6 a charge unit connected in parallel to the commutation capacitor 3, numeral 7 a negative bus, numeral 7*a* a power-side terminal of the negative bus 7, and numeral 7*b* a load-side terminal of the negative bus 7. Further, a load 8 is connected between the load-side terminals 1*b* and 7*b*. A DC power supply V is inserted between the power-side terminals 1*a* and 7*a*.

In FIG. 1, in a circuit-breaking operation, an open command is applied to the breaker unit 2, and after the breaker unit 2 is opened, the thyristor switch 5 making up the first switch is turned on, that is, fired, so that the discharge current ② from the commutation capacitor 3 charged in advance from the charge unit 6 is supplied in the direction reverse to the energization current ① of the breaker unit 2. The sum of the currents ① and ② flowing through the breaker unit 2 develops a point of zero, with the result that the arc of the breaker unit 2 is extinguished, and the line current ① commutates to the commutation capacitor 3, thereby completing the current-limiting process.

The above-mentioned conventional system, however, requires a charge unit 6 exclusively used for charging the commutation capacitor 3. In the case where the capacitor is charged directly from the DC line 1, on the other hand, the charging from the load side of the breaker unit 2 is necessary depending on the charging polarity, and the breaking function is required to be given up until the capacitor 3 is completely charged after the breaker unit 2 is turned on, thereby hampering practical applications of this sytem. In the case where an exclusive charge unit 6 is inserted, it is also necessary to insert an inverter for introducing power from a DC battery or the DC line 1 to assure power reliability. This complicates the system on the one hand and reduces the reliability of the DC line at the same time.

SUMMARY OF THE INVENTION

An object of the present invention is to provide a DC circuit breaker including a commutation capacitor capable of being directly charged from a DC line.

Another object of the present invention is to provide a DC circuit breaker simple in construction and low in cost, in which a magnetic repulsive coil and switch means are connected in parallel to a commutation capacitor for LC resonant discharge, and by thus reversing the charge polarity of the commutation capacitor, the charge unit is eliminated.

According to the present invention, there is provided a DC circuit breaker comprising a commutation capacitor with an end thereof connected to the power side of a DC line and the other end thereof to a negative bus of the DC line through a charge resistor, and a series circuit including a magnetic repulsive coil and a second switch connected in parallel to the commutation capacitor, in which the commutation capacitor is charged directly from the power side of the DC line, and when the breaker unit starts to open, the second switch is turned on thereby to reverse the polarity of the charged commutation capacitor to supply a reverse discharge current through the breaker unit while at the same time starting to open the breaker unit.

The commutation capacitor is normally charged through a charge resistor from the DC line. When the breaker unit starts to open, the second switch such as a second thyristor switch is turned on, and the commutation capacitor has the polarity thereof reversed in such a manner that the breaker unit is supplied with a discharge current reverse to the energization current, while at the same time starting the opening of the breaker unit. Specifically, when the second thyristor switch is turned on, the commutation capacitor is discharged by resonance through the magnetic repulsive coil and the second thyristor switch. When a resonance current flows in the magnetic repulsive coil, a magnetic repulsion force is generated thereby to start to open the breaker unit. The resonance current is blocked by the second thyristor switch at the zero current point in the half cycle, in which case the charge polarity of the commutation capacitor is reversed. In this way, when the first switch such as the first thyristor switch is turned on at the time of opening the breaker unit, a discharge current reverse in direction to the energization current flows from the commutation capacitor through a reactor to the breaker unit, thus breaking the line current. A DC circuit breaker comprising a commutation capacitor capable of being directly charged from a DC line is thus provided in which the satisfactory functions thereof are not adversely affected even when the commutation capacitor is charged directly from the DC line.

BRIEF DESCRIPTION 0F THE DRAWINGS

DESCRIPTION OF THE PREFERRED EMBODIMENTS

Figure 2:
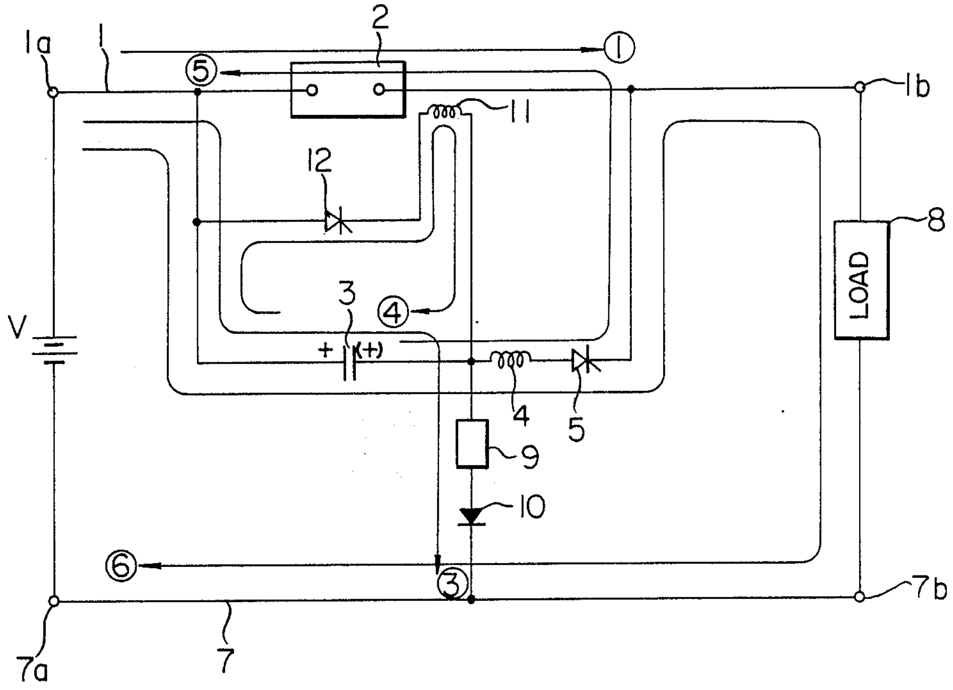
FIG. 2 is a diagram showing a circuit of a DC circuit breaker of reverse/current insertion type according to the present invention.

A circuit diagram of a DC circuit breaker of reverse current insertion type according to an embodiment of the present invention is shown in FIG. 2.

Figure 1:
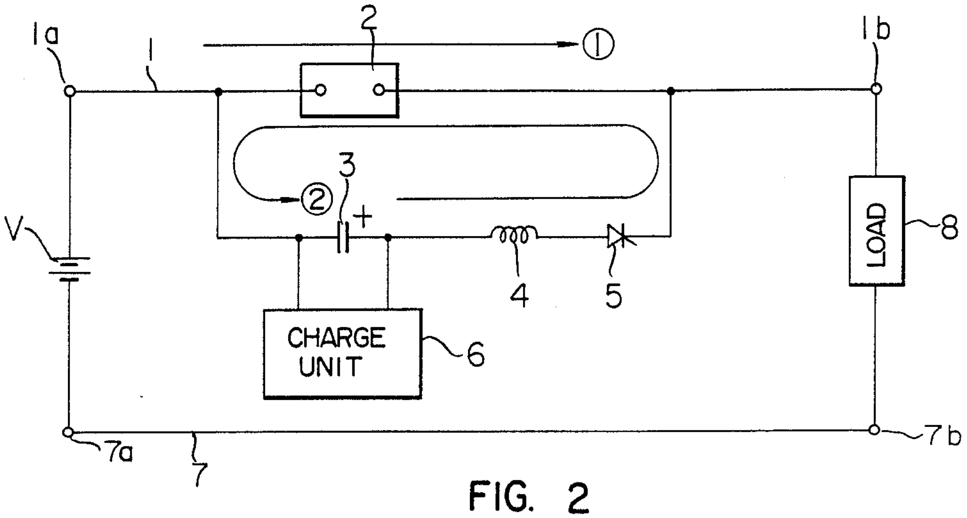
FIG. 1 PRIOR ART
FIG. 1 is a diagram showing a basic circuit of a conventional DC circuit breaker of reverse current insertion type.

Those component parts identical to the parts in FIG. 1 are designated by the same reference numerals and are not described. In this embodiment, a commutation capacitor 3 has an end thereof connected to the powerside terminal 1*a* of a DC line 1 and the other end thereof connected through a charge resistor 9 and a diode 10 to a negative bus 7 of the DC line 1. At the same time, the commutation capacitor 3 is connected in parallel to a series circuit including a magnetic repulsive coil 11 and a second thyristor switch 12 making up a second switch.

Now, explanation will be made of the commutation processes of the DC circuit breaker according to the present invention with reference to FIG. 2.

(i) The commutation capacitor 3 is normally charged directly from the DC power supply V side of the DC line 1 through the charge resistor 9 and the diode 10 as shown by +. (charge current ③)

(ii) Then, the second thyristor switch 12 is turned on, with the result that the commutation capacitor 3 is discharged by LC resonance through the magnetic repulsive coil 11 and the second thyristor switch 12. When the LC resonance current ④ flows in the magnetic repulsive coil 11, a magnetic repulsive force is generated thereby to start the opening of the breaker unit 2. The LC resonance current ④ is blocked by the second thyristor switch 12 at the point of zero current in the half cycle, in which case the charge polarity of the commutation capacitor 3 is reversed as shown by (+).

(iii) When the first thyristor switch 5 is turned on with the opening of the circuit breaker unit 2, a discharge current ⑤ reverse in direction to the energization current ① flows in the breaker unit 2 from the commutation capacitor 3 through the reactor 4 and the first thyristor switch 5, so that the current flowing in the breaker unit 2 develops a zero current point, with the result that the arc of the breaker unit 2 is extinguished.

(iv) When the arc of the breaker unit 2 is completely extinguished and the circuit is thus broken, the commutation current ⑥ flows through the DC power supply V, the commutation capacitor 3, the reactor 4, the first thyristor switch 5, the load 8 and the negative bus 7 in that order.

A DC circuit breaker having a commutation capacitor 3 capable of being charged directly from the DC line 1 is thus provided, which displays the functions thereof in satisfactory manner even when the commutation capacitor 3 is charged directly from the DC line 1 through the process described above.

Specifically, according to the present invention, a series circuit including the magnetic repulsive coil 11 and the second thyristor switch 12 is connected in parallel to the commutation capacitor 3, and the commutation capacitor 3 is connected through the charge resistor 9 and the diode 10 to the negative bus 7 and the power side of the line 1. By doing so, the commutation capacitor 3 is charged positively on the left side in FIG. 2 from the DC line 1 through the charge resistor 9 and the diode 10 in a manner irrespective of the open or closed condition of the breaker unit 2. Upon issue of a break command for the breaker unit 2, the second thyristor switch 12 is turned on, and the commutation capacitor 3 is discharged by resonance through the magnetic repulsive coil 11 and the second thyristor switch 12. When the LC resonance current ④ flows in the magnetic repulsive coil 11, a magnetic repulsive force is generated thereby to start the opening of the breaker unit 2. This LC resonance current ④ is blocked by the second thyristor switch 12 at the zero current point in the half cycle, and the charge polarity of the commutation capacitor 3 is reversed with the right side thereof to positive in the drawing. When the breaker unit 2 has fully opened, the first thyristor switch 5 is turned on, so that the commutation capacitor 3 is discharged by resonance through the reactor 4, the first thyristor switch 5 and the breaker unit 2. As a result, the breaker unit 2 is supplied with a current ⑤ reverse in direction to the line current ① that is an energization current and thus develops a zero current point. The breaker unit 2 is therefore extinguished, and the line current ① commutates to the commutation capacitor 3 thereby to complete the current limiting process.

Generally, the output of the magnetic repulsive coil 11 used as a resonance circuit for reversing the charge polarity of the commutation capacitor 3 has such a characteristic as to decrease sharply with the increase in the clearance from the conductive short ring opposed thereto, and most of the effective output of the magnetic repulsive coil 11 is generated in the half cycle of the resonance current thereof. Therefore, the output is not substantially reduced if the resonance current of the magnetic repulsive coil 11 is blocked in half cycle. By thus blocking the current in half cycle, it is thus possible to utilize as a commutation energy the energy which otherwise would be consumed by the resistance of the subsequent circuit portions, thereby making it possible to reduce the whole charging energy for the commutation capacitor.

Figure 3:
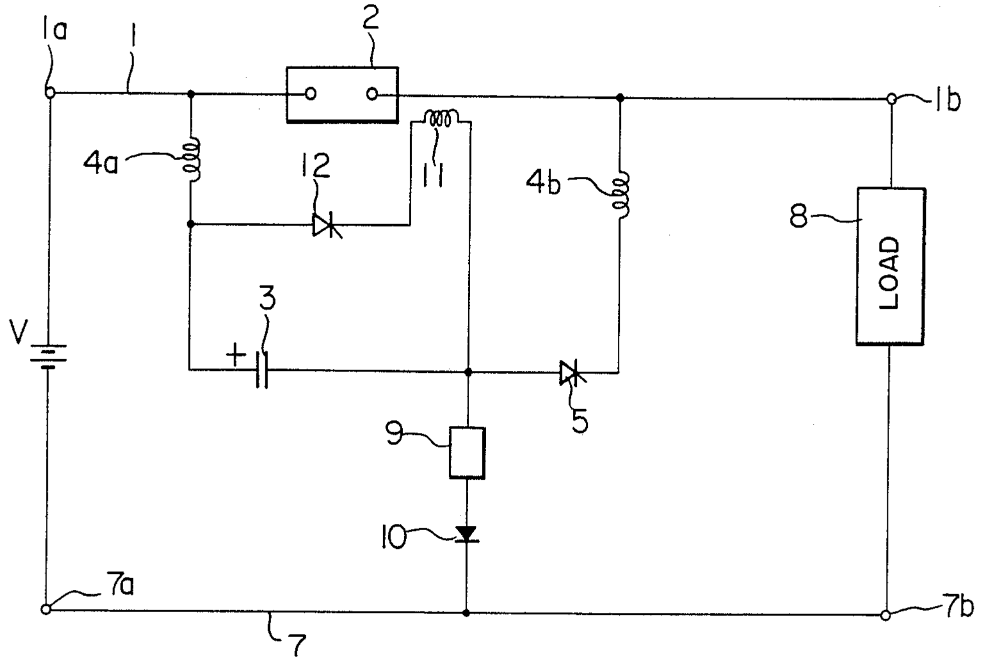
FIGS. 3 and 4 show other practical embodiments of the present invention.

A circuit of a second embodiment of the present invention is shown in FIG. 3, in which the reactor 4 of FIG. 2 is arranged at a different point. Specifically, in FIG. 3, the reactor 4 may be located at any of the points 4*a* or 4*b* with quite the same effect as in the first embodiment shown in FIG. 2.

Further, the reactor 4 may be done without if the reactance L of the wire is used.

Figure 4:
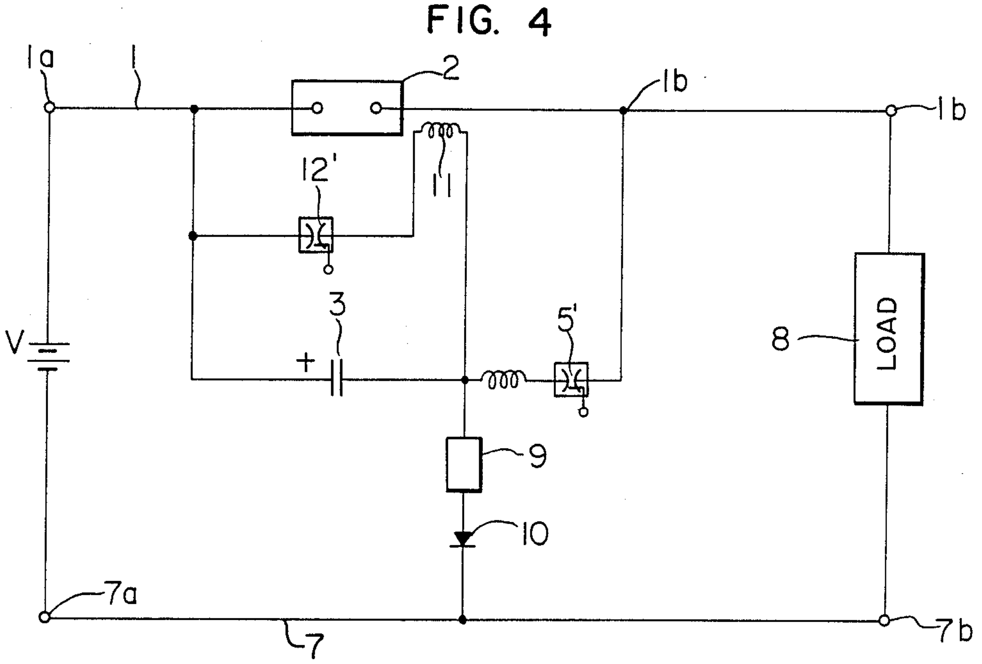

A circuit according to a third embodiment of the present invention is shown in FIG. 4. In this embodiment, a trigger gap is used in place of the thyristors making up the first and second switches in FIG. 2 with exactly the same effect as in the first embodiment of FIG. 2.

According to the present embodiment, as explained above, the commutation capacitor 3 is capable of being charged directly from the power side of the DC line 1, and therefore a predetermined charge voltage and polarity are obtained in a manner irrespective of the open or closed condition of the breaker unit 2, thus eliminating the need of an exclusive charge unit. The reliability of the DC line 1 is thus improved while at the same time providing an economical DC breaker unit. Further, effective utilization of the charging energy of the commutation capacitor 3 is made possible, thus reducing the capacitance of the commutation capacitor 3.

The breaker unit 2 may take the form of vacuum circuit breaker, gas circuit breaker or air circuit breaker, of which the vacuum circuit breaker is considered as the best choice as a circuit breaker unit 2 in view of the fact that it has a superior high-frequency current breaking performance, that the resonance discharge current of the commutation circuit configured of the commutation capacitor 3 and the reactor 4 may be supplied in high frequency to reduce the capacitance of the commutation capacitor 3, and that a small opening stroke provides a sufficient extinguishing ability for suitable application to high-speed breaking.

Further, instead of the magnetic repulsive coil 11 explained above as a resonance discharge circuit for reversing the charge polarity of the commutation capacitor 3, any coil for driving the breaker unit 2 to open side may be used with equal effect.

It will thus be understood from the foregoing description that according to the present invention, a commutation capacitor is capable of being charged directly from the DC line, thereby making possible a DC breaker unit having such a commutation capacitor.

Furthermore, according to the present invention, there is provided a DC circuit breaker low in cost and simple in construction eliminating the need of a charge unit by inserting a magnetic repulsive coil and switch means in parallel to a commutation capacitor and reversing the charge polarity of the commutation capacitor.

We claim:

1. A DC circuit breaker comprising:

a breaker unit arranged in a main DC line;

a first series circuit including a commutation capacitor, a reactor and first switch means inserted in parallel to the breaker unit;

a charge resistor inserted between the negative bus of the DC line and the commutation capacitor; and a second series circuit including a magnetic repulsive coil and second switch means arranged in parallel to the commutation capacitor, wherein a reverse current is supplied to the DC line by LC resonance thereby to generate a zero current and to extinguish an arc in the breaker unit.

2. A DC circuit breaker comprising:

a breaker unit arraned in a main DC line;

a first series circuit including a commutation capacitor, a reactor and a first thyristor inserted in parallel to the breaker unit;

a charge resistor inserted between the negative bus of the DC line and the commutation capacitor; and a second series circuit including a magnetic repulsive coil and a second thyristor arranged in parallel to the commutation capacitor, wherein a reverse current is supplied to the DC line by LC resonance thereby to generate a zero current and to extinguish an arc in the breaker unit.

3. A DC circuit breater comprising:

a breaker unit arranged in a main DC line;

a first series circuit including a commutation capacitor, a reactor and a first trigger gap inserted in parallel to the breaker unit;

a charge capacitor inserted between the negative bus of the Dc line and the commutation capacitor; and a second series circuit including a magnetic repulsive coil and a second trigger gap arranged in parallel to the commutation capacitor, wherein a reverse circuit is supplied to the DC line by LC resonance thereby to generate a zero current and to extinguish an arc in the breaker unit.

4. A DC circuit breaker comprising:

a vacuum interruption arranged in a main DC line;

a first series circuit including a commutation capacitor, a reactor and first switch means inserted in parallel to the vacuum interruptor;

a charge resistor inserted between the negative bus of the DC line and the commutation capacitor; and a second series circuit including a magnetic repulsive coil and second switch means arranged in parallel to the commutation capacitor;

wherein a reverse current is supplied to the DC line by LC resonance thereby to generate a zero current and to extinguish an arc in the vacuum interruptor.

5. In a DC circuit breaker comprising a breaker unit arranged in a main DC line a first series circuit including a commutation capacitor, a reactor and first switch means inserted in parallel to the breaker unit, a charge resistor inserted between the negative bus of the DC line and the commutation capacitor, and a second series circuit including a magnetic repulsive coil and second switch means arranged in parallel to the commutation capacitor, a method of commutation of the DC circuit breaker comprising the steps of (1) charging the commutation capacitor normally through the charge resistor directly from the DC power side of the main DC line, (2) turning on the second switch means, discharging the commutation capacitor by LC resonance through the magnetic repulsive coil and the second switch means, and thus reversing the charging polarity of the commutation capacitor, and (3) turning on the first switch means when the breaker unit starts to open, thereby supplying the breaker unit, from the commutation capacitor through the reactor and the first switch meqans, with a discharge current reverse in direction to the energization current flowing in the main DC line thereby to generate a zero current and to extinguish an arc in the breaker unit.

* * * * *